Dec. 1, 1959  E. OAKLEY  2,914,859
GAGING APPARATUS
Filed Feb. 23, 1956  4 Sheets-Sheet 1
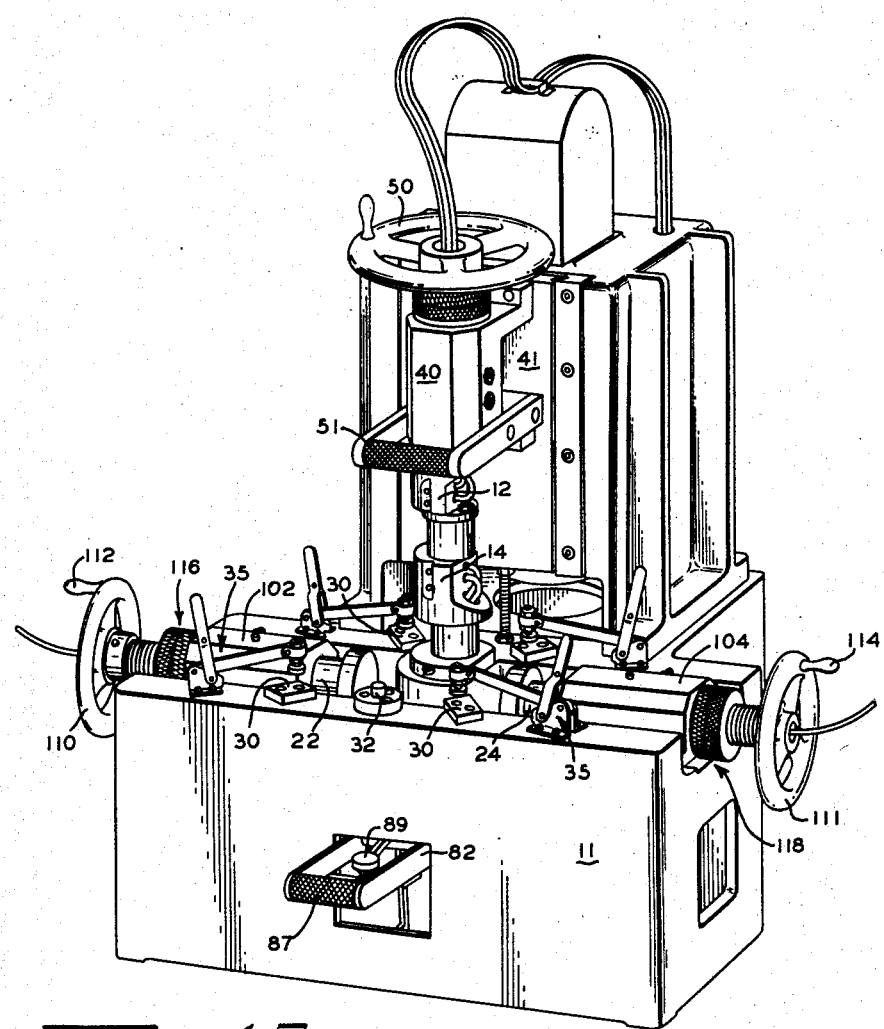
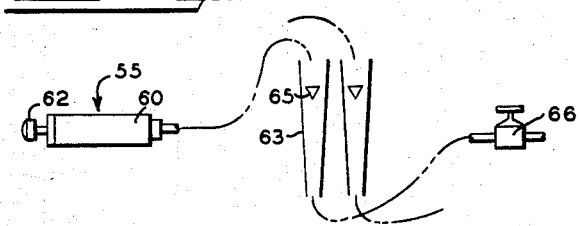
INVENTOR.
Elmore Oakley
BY Edward T. Noix
atty Dec. 1, 1959   E. OAKLEY   2,914,859
GAGING APPARATUS
Filed Feb. 23, 1956   4 Sheets-Sheet 2
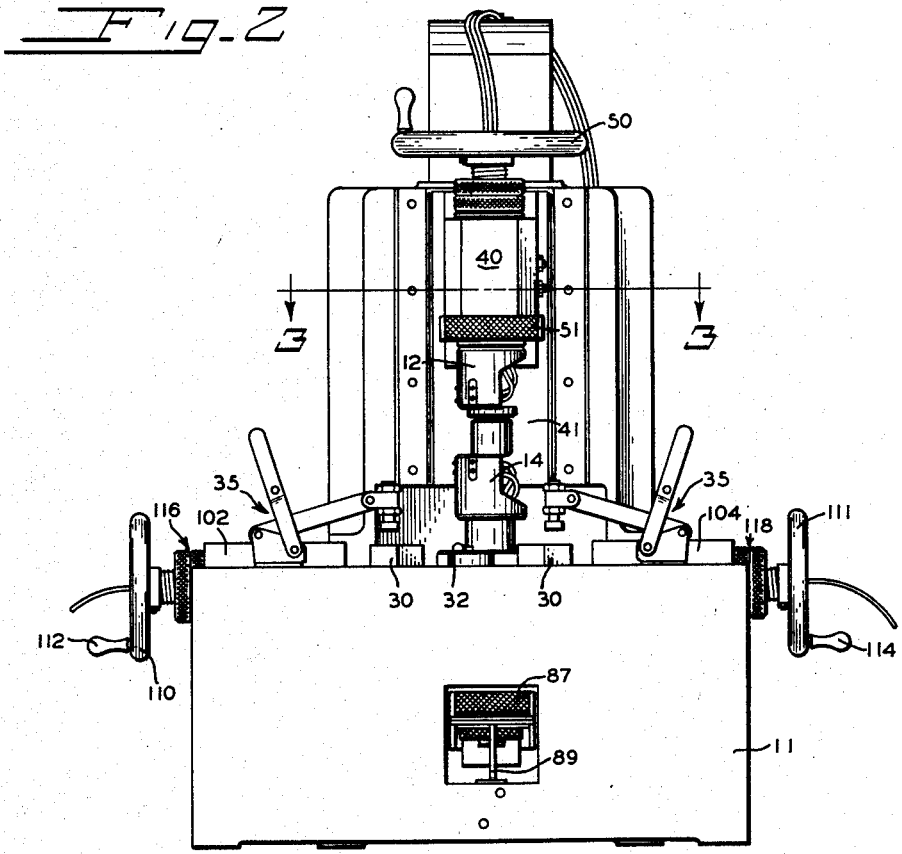
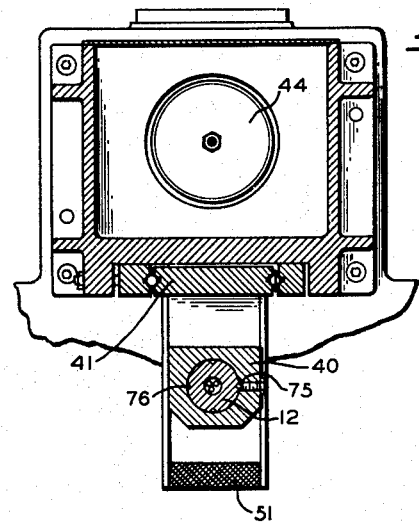
INVENTOR.
Elmore Oakley
BY Edward J. Noig
   atty Dec. 1, 1959
E. OAKLEY
2,914,859
GAGING APPARATUS
Filed Feb. 23, 1956
4 Sheets-Sheet 3
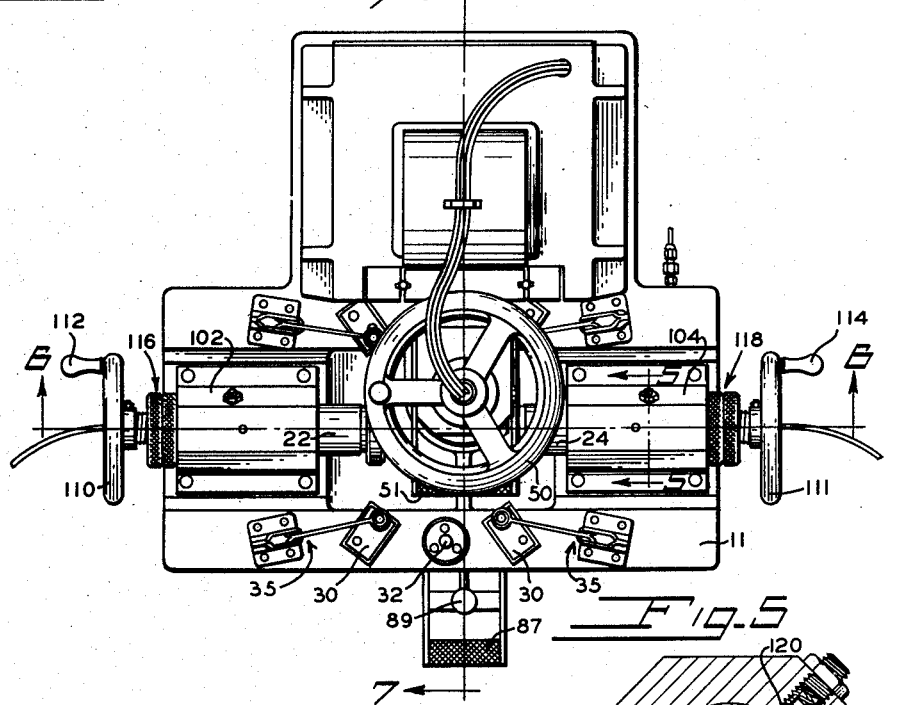
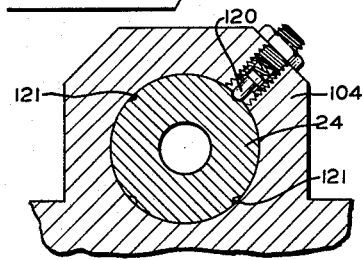
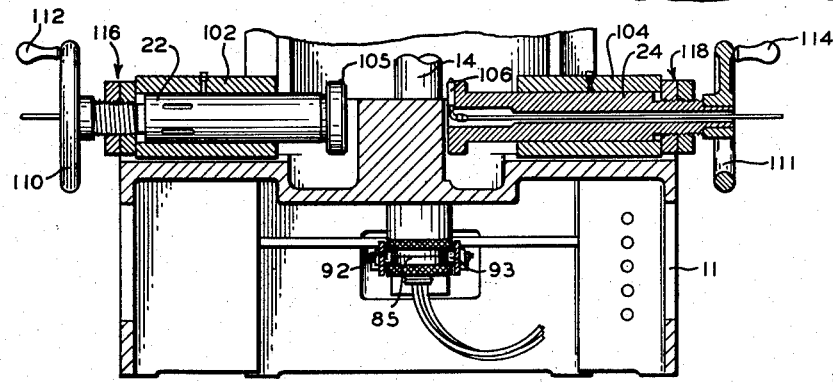
INVENTOR.
Elmore Oakley
BY Edward J. Noé
atty Dec. 1, 1959 E. OAKLEY 2,914,859
GAGING APPARATUS
Filed Feb. 23, 1956
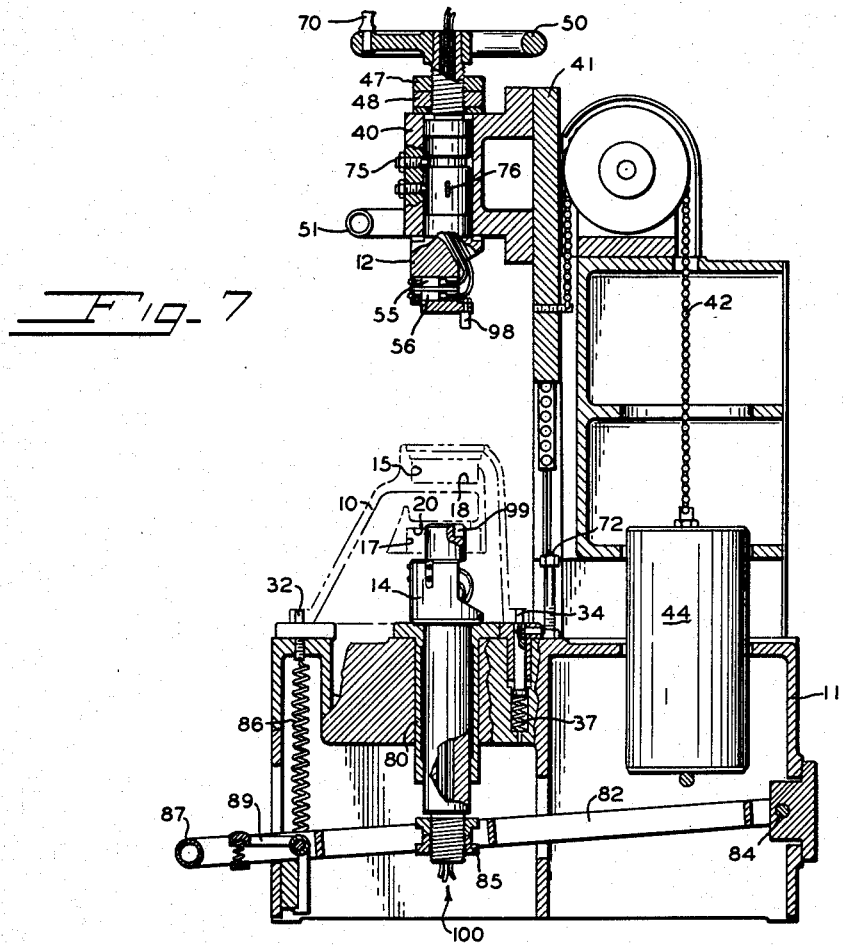
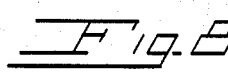
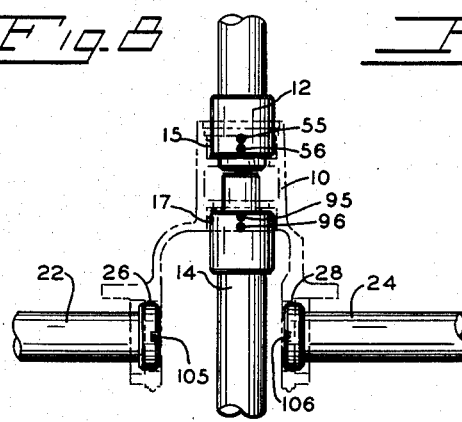
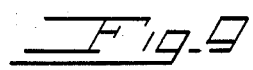
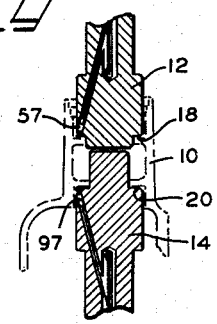
INVENTOR.
Elmer Oakley
BY Edward T. Noig
atty

United States Patent Office 2,914,859
Patented Dec. 1, 1959

2,914,859

GAGING APPARATUS

Elmore Oakley, Mount Clemens, Mich., assignor to Perfex Gage and Tool Company, Mount Clemens, Mich., a corporation of Michigan Application February 23, 1956, Serial No. 567,360

15 Claims. (Cl. 33—174)

This invention relates to gaging apparatus and more particularly to apparatus for gaging dimensional characteristics and locations of part surfaces.

It is an object of this invention to provide an apparatus for rapidly and accurately gaging dimensional characteristics and locations of annular surfaces of a part.

It is a further object to provide such an apparatus for gaging bore locations and characteristics in a part such as a differential carrier or housing portion.

It is a further object to provide an apparatus for gaging dimensional characteristics of a pair of substantially aligned annular surfaces of a part wherein a pair of coaxially rotatable gaging spindles are movable toward one another to carry gaging means into association with the surfaces, interdrive means being provided to insure equal rotation of the spindles during gaging and to determine the relative disposition of the gaging means about the axes of the respective spindles.

It is a further object to provide an apparatus for gaging the disposition of annular surfaces or passages relative to one another and with respect to reference surfaces of a part by means of rotatable gaging spindles carried in the apparatus for movement into association with surfaces of a part held in a reference position in the apparatus, each spindle carrying gaging means for movement about the axis of the respective spindle and along an annular surface of the part.

Other objects and advantages of the invention will be apparent from the following description, the appended claims, and the accompanying drawing, in which, Figure 1 is a perspective view of an illustrative apparatus embodying the present invention, Figure 2 is a front view in elevation of the apparatus of Figure 1, Figure 3 is a sectional view on line 3—3 of Figure 2, Figure 4 is a plan view of the apparatus, Figure 5 is a section on line 5—5 of Figure 4, Figure 6 is a section on line 6—6 of Figure 4, Figure 7 is a section view on lines 7—7 of Figure 4, Figure 8 illustrates a differential carrier in phantom with the gaging spindles in gaging position, Figure 9 is a longitudinal section through the upper pair of spindles of Figure 8 taken in the plane of that view, and Figure 10 is a diagrammatic illustration of a gaging and indicating means.

The present invention provides rotatable gaging spindles movable to carry gaging means into association with annular surfaces of a part located in a reference position. By rotating the spindles and moving the gaging means along the surfaces to be gaged the dimensional characteristics of the surfaces can be determined. Also, because the part is located in a reference position and the dispositions of the spindles are known, by rotation of the spindles the location of the axes of the surfaces can be determined and their relative positions also checked.

In the illustrated apparatus the carrier of an automotive differential is mounted and clamped in a reference position in a gaging apparatus. Vertically movable gaging spindles carry gaging means into association with upper and lower bearing bores. Because these bores are situated at each side of smaller passages in the carrier interdrive means are provided at the opposing ends of these spindles to interconnect the spindles for simultaneous equal rotation and to relatively dispose the gaging means carried thereby in a known relationship. Horizontally movable spindles are provided, one for movement into association with each of the cross bores of the carrier. By noting and comparing the gaging indications as the spindles are rotated, various dimensions and locations can be accurately gaged as will be later described in more detail.

A differential carrier 10 to be gaged is located and clamped on the upper surface of a base 11 in a reference position. A pair of coaxially rotatable gaging spindles 12 and 14 are mounted for vertical movement toward one another to carry gaging means supported thereby into association with upper bore 15 and lower bore 17 of the carrier. The gaging spindles also carry gaging means for association with the bearing seats 18 and 20 at the adjacent ends of the bores.

Spindles 22 and 24 are rotatable on base 11 and move toward one another to carry gaging means into association with cross bores 26 and 28 respectively.

The lower flange of carrier 10 is located on pads 30 provided on the upper surface of base 11. Locating pins 32 and 34 project into receiving holes in the carrier flange to positively determine the position of the part. Conventional toggle clamps, such as indicated at 35, are provided to engage the upper surface of the carrier flange in opposition to the locating pads 30. Locating pin 34 is urged upward by a spring 37 provided in base 11. Thus the carrier is disposed in a reference position in the apparatus for gaging.

Spindle 12 for upper bore 15 is rotatably supported in a mount 40 on a ball slide 41 counterbalanced by a chain 42 and weight 44. Spindle 12 is clamped against endwise movement in mount 40 by cooperating nuts 47 and 48 and is rotated by means of a hand wheel 50 at its upper end. The entire upper spindle assembly is raised and lowered by means of a forwardly projecting handle 51.

Gaging means are provided at the lower end of spindle 12 for association with upper bore 15 and bearing seat 18. In the illustrated application a pair of air leakage gaging cartridges 55 and 56 are radially disposed in a common axial plane for association with bore 15 and a third cartridge 57 projects forwardly at the lower end of the spindle for gaging bearing seat 18.

Each of the gaging cartridges utilized in the disclosed apparatus is of a similar known construction and (referring to Figure 10) comprises a cartridge body 60 housing a leakage orifice controlled in turn by the inner end of a plunger having a work contactor 62 at its outer end. Flow through the orifice can be indicated by any conventional flow responsive indicating means; however, it is preferred to use indicators of the column type wherein an internally tapered flow tube 63 has an indicating float 65 movable therealong. Air is supplied to the tube through a regulator 66. The indicating tubes connected to the cartridges in the apparatus are positioned parallel and adjacent in order that their readings may be readily compared.

Handle 70 of hand wheel 50 is in a common plane with cartridges 55 and 56 in order that the orientation of the cartridges about the spindle axis and with respect to bore 15 can be easily determined. In gaging, spindle 12 is lowered to a position determined by the engagement of adjustable stop 72 with the lower end of slide 41. Ninety-degree positions of rotation of spindle 12 can be "felt" by the operator through the cooperation of a spring-urged projection or detent 75 with grooves 76 spaced around the spindle axis.

Spindle 14 for gaging lower bore 17 and seat 20 is vertically slidable in a sleeve 80. The lower position of spindle 14 is determined by engagement of an enlarged upper portion with the upper end of sleeve 80. A lever 82 pivoted at 84 in base 11 is connected through a split collar 85 with the lower end of spindle 14. As seen in Figure 6 lever 82 extends to each side of collar 85 and carries rollers 92 and 93 engaging the flanges of the collar. Lever 82, and spindle 14, are resiliently urged upward by a spring 86 connected at its upper end to base 10 and at its lower end to the lever. A handle 87 at the outer end of lever 82 serves to rock lever 82 in a counterclockwise direction as viewed in Figure 7 to lower the spindle and a releasable latch 89 locks the spindle in its lowered position. Engagement of collar 85 with the lower end of sleeve 80 determines its upward position.

The gaging means at the upper end of spindle 14 are disposed similarly to those in spindle 12 and include a pair of radial cartridges 95 and 96 for association with the wall of bore 17 and a forwardly directed cartridge 97 for gaging the bearing seat.

Cooperating interdrive means are provided at the adjacent ends of spindles 12 and 14 for engagement through the smaller passages between bores 15 and 17. As illustrated this interdrive includes a projection 98 on spindle 12 extending parallel to the spindle axis and radially offset. A receiving depression 99 is provided offset from the axis of spindle 14. Thus when upper spindle 12 is lowered and lower spindle 14 is raised projection 98 moves into depression 99, interlocking the spindles for simultaneous rotation and orienting the gaging cartridges 55, 56, 95 and 96 in a common plane including the axis of spindle rotation. In Figures 1 and 2 the upper and lower spindles are shown in engagement but with the part removed. In Figures 8 and 9 they are in gaging association with the surfaces to be measured. Tubes 100 leading from cartridges 95, 96, and 97 in the lower spindle extend downwardly through the spindle and lead to indicating instruments of the type disclosed diagrammatically in Figure 10. Tubes similarly lead from the other cartridges of the apparatus.

When spindles 12 and 14 are in gaging position a comparison of the readings of the indicators associated with cartridges 55 and 56 will indicate the angle of the bore wall relative to the lower surface of the carrier flange engaging locating pads 30. By noting the readings obtained with cartridges 55 and 56 disposed in one direction, then rotating the spindles 180 degrees and again at noting the readings the location of the bore axis in this plane can also be determined. During rotation of the spindles conditions such as roundness, taper, and the like can also be determined. Cartridge 57 directed forwardly at the lower end of spindle 12 moves along the bearing seat 18 and the run-out of the seat can be gaged. Run-out can be defined as deviation from a plane perpendicular to the nominal axis. Similarly, cartridges 95 and 96 serve to gage characteristics of bore 17, its location and disposition, and cartridge 95 gages the run-out of the lower bearing seat 20. The comparison of the readings obtained from cartridges 57 and 97 as they are rotated will indicate the parallelism of the seats relative to one another.

Cross bore spindles 22 and 24 are carried for rotation and axial sliding in supports 102 and 104 on base 11. Gaging cartridges 105 and 106 are disposed radially at the inner ends of spindles 22 and 24 respectively. Hand wheels 110 and 111 connected at the outer ends of the spindles include handles 112 and 114 disposed in the planes of the respective cartridges to determine their orientation about the spindle axes. Cooperating lock nut sets 116 and 118 determine the inward position of the spindles through engagement with the outer ends of the respective mounts 102 and 104. A detent 120 in mount 104 engages grooves 121 along the spindle to give the operator an indication of the 90-degree positions of spindle rotation. Similar structure is provided for spindle 22.

Once the part is positioned and clamped for gaging cross bore spindles 22 and 24 are moved toward one another to gaging position. As they are moved inward and cartridges 105 and 106 are carried along bores 26 and 28 with the handles in a vertical position and cartridges 105 and 106 directed radially upward, observance of the response of the associated indicators will indicate the parallelism of the bores relative to the lower face of the part flange. The squareness of bores 26 and 28 relative to the locating holes into which pins 32 and 34 project can be determined by observing the indicator movement as the spindles are fed in with the handles in horizontal positions. A comparison of the indications obtained with the handles of spindles 22 and 24 directed forwardly (to the left as the apparatus appears in Figure 7) with the indications obtained with the handles directed to the rear give an indication of the location of the axes of bores 26 and 28 in a fore and aft direction. If the bore and spindle axes coincide the indications obtained will be equal. The difference in indications will be indicative of the relative displacement between the bore and spindle axes in the fore and aft direction. Similarly the location of bores 15 and 17 can be determined. By comparing the location of bores 15 and 17 with those of bores 26 and 28 the relative disposition of the gaged surfaces can be determined. Similarly the roundness, taper and other characteristics of bores 26 and 28 can be gaged.

Thus it is seen that an apparatus has been provided for performing a complete study of the dimensional characteristics, location and the like of annular surfaces in a part. Through the interdrive of a pair of the spindles a difficult gaging operation has been made possible in an extremely simple manner. Through a comparison of the readings obtained, the relative dispositions of the surfaces can be gaged and their deviations from nominal locations in the part determined. The apparatus is simple in construction and operation and reliable for continued gaging operations through a long service life.

It is understood that this invention is not limited to the precise form illustrated, the scope of the invention being defined in the appended claims.

What is claimed is:

1. An apparatus for gaging dimensional characteristics of a pair of spaced surfaces in a passage through a part to be gaged, comprising a base, a pair of gaging spindles, each having gaging means for association with one of the surfaces, means carrying said spindles on said base for rotation and for relative movement toward one another into association with the surfaces, interdrive means at the adjacent ends of said spindles for engagement within the passage of the part to interconnect the spindles for simultaneous rotation, and drive means for rotating the spindles for gaging dimensional characteristics of the surfaces.

2. An apparatus for gaging dimensional characteristics of a pair of spaced substantially coaxial annular surfaces in a part and relationships between the surfaces comprising a base, means on said base for clamping a part in a fixed reference position for gaging, a pair of gaging spindles, each having gaging means at one side thereof for association with one of said annular surfaces, means carrying said spindles on said base in coaxial alignment for rotation and for relative axial movement toward one another into association with the respective annular surfaces, engageable drive means at the opposing ends of said spindles for relatively orientating the spindles and gaging means and interconnecting the spindles for simultaneous equal rotation, and drive means operatively connected to one of said spindles for rotating the spindles and moving the gaging means over the annular surfaces for gaging the surfaces and their relative dispositions.

3. An apparatus as set forth in claim 2 further comprising means connected to one of said spindles to resiliently urge said spindles together, whereby said engageable drive means are maintained in operative engagement during gaging.

4. An apparatus as set forth in claim 2 wherein said drive means includes a projection at the inner end of one of said spindles offset from the axis of spindle rotation and a receiving depression correspondingly offset at the opposing end of the other of said spindles.

5. An apparatus as set forth in claim 2 wherein said gaging means comprises a pair of gaging units for each spindle disposed in a common radial plane, each gaging unit including a movable work contactor for engagement with the associated annular surface.

6. An apparatus for gaging dimensional characteristics of a pair of spaced, substantially coaxial annular surfaces and relationships therebetween comprising a base, a pair of gaging spindles, each having gaging means at one side thereof for association with one of the annular surfaces, means carrying said spindles on said base in coaxial alignment for rotation and for relative movement toward one another to carry the gaging means into association with the respective surfaces, cooperating drive means at the opposing ends of the spindles including a projection on one and a receiving depression on the other to relatively orientate the gaging means and interlock the spindles for simultaneous equal rotation, and drive means operatively connected to one of said spindles for rotation thereof whereby the gaging means are moved over the annular surfaces and about the spindle axes.

7. An apparatus for gaging dimensional characteristics of annular surfaces at each end of smaller passage means in a part comprising, a base, means on said base for locating a part for gaging, a pair of gaging spindles, means carrying said spindles on said base for rotation and for relative axial movement toward one another into gaging association with said annular surfaces, each spindle having gaging means at one side thereof for association with the respective annular surface, interdrive means at the adjacent ends of the spindles engageable upon movement of the spindles together to interconnect the spindles for simultaneous rotation with the gaging means of the respective spindles in a predetermined relationship about the axis of rotation, and drive means connected to rotate one of the spindles whereby the other spindle is simultaneous and equally rotated for a study of dimensional characteristics of the annular surfaces, their relative alignment, and the disposition of the surfaces relative to the locating means.

8. An apparatus for gaging dimensional characteristics and location of annular surfaces of a part to be gaged comprising a base, means on said base for mounting a part in reference gaging position, gaging spindles, means on said base mounting each of said spindles for rotation and for axial sliding movement into association with an annular surface of the part and including means mounting a pair of spindles in coaxial alignment, each of said spindles having gaging means for association with the respective annular surface, said pair of spindles having engageable interdrive means cooperating between the adjacent ends thereof for operatively interconnecting the spindles for rotation and disposing the gaging means in a predetermined relationship, drive means connected for rotating the spindles, and means operatively connected to each of the spindles for determining the orientation of the gaging means about the spindle axes.

9. An apparatus for gaging dimensional characteristics and location of annular surfaces of a part comprising a base, locating means on said base for clamping a part in a reference gaging position in the apparatus, a first pair of gaging spindles coaxially supported on said base for rotation and axial movement toward one another into gaging association with a first pair of substantially aligned annular surfaces of the part, a second pair of gaging spindles coaxially supported on said base for rotation and axial movement toward one another into gaging association with a second pair of substantially aligned annular surfaces of the part, each of said spindles having gaging means at one side of the respective axis for association with the respective annular surface, said first pair of spindles having engageable interdrive means cooperating between the adjacent ends thereof for operatively interconnecting the spindles for rotation and with the gaging means at common sides thereof, drive means connected to one spindle of the first pair and both spindles of the second pair for rotation thereof to carry the gaging means along the annular surfaces, and means operatively connected to each of the spindles for determining the orientation of the gaging means about the spindle axes.

10. An apparatus as set forth in claim 9 wherein the first pair of annular surfaces are positioned in the apparatus in substantially vertical alignment and the support means for the first pair of spindles carries the spindles for vertical movement and includes means resiliently urging the lower spindle upward toward gaging position, releasable latch means for holding the lower spindle in its downward position, and counterbalance means connected to the upper spindle of the pair, the support means for the other pair of spindles disposing the spindles in horizontal alignment.

11. An apparatus as set forth in claim 9 wherein said interdrive means includes a projection offset from the axis of rotation of one spindle, and a receiving depression similarly offset in the opposing end of the other spindle of the pair.

12. An apparatus as set forth in claim 9 wherein said drive means includes manually rotatable means operatively connected for rotating the spindles, and detent means associated with the spindles for yieldingly locating the spindles in predetermined positions of rotation.

13. An apparatus as set forth in claim 9 wherein a pair of said cooperating spindles each includes a pair of gaging units radially mounted in a common axial plane.

14. An apparatus as set forth in claim 9 wherein the gaging means of each spindle of the first pair includes a pair of spaced gaging units radially mounted in a common axial plane, and a gaging unit projecting forwardly for association with a part surface extending at an angle to the axis of the respective spindle.

15. An apparatus for gaging dimensional characteristics of a pair of spaced surfaces such as a pair of substantially coaxial holes in a passage through a part to be gaged, comprising a base, a pair of gaging spindles, each having gaging means at one side thereof for association with one of the surfaces for measuring the radial displacement between the spindle axis and the adjacent side of the respective surface, means carrying said spindles in coaxial relationship on said base for rotation and for relative axial movement toward one another into association with the surfaces, interdrive means at the adjacent ends of said spindles for engagement within the passage of the part to interconnect the spindles for simultaneous rotation while disposing the gaging means at common sides of the spindles in a common plane radial to the axis of rotation of said spindles, drive means for rotating the spindles for gaging dimensional characteristics of the surfaces, and indicating means connected to each of said gaging means for comparing the dimensions measured and determining the relative eccentricity of said surfaces.

(References on following page)

References Cited in the file of this patent

UNITED STATES PATENTS

| | | |
|---|---|---|
| 310,313 | Proctor | Jan. 6, 1885 |
| 2,043,614 | Hane | June 9, 1936 |
| 2,316,877 | Maag | Apr. 20, 1943 |
| 2,437,783 | Hutchinson | Mar. 16, 1948 |
| 2,552,602 | Surline | May 15, 1951 |
| 2,571,161 | Poole | Oct. 16, 1951 |
| 2,621,416 | Brenneke | Dec. 16, 1952 |
| 2,659,157 | Aller | Nov. 17, 1953 |
| 2,712,181 | Mahlmister | July 5, 1955 |

OTHER REFERENCES

American Digest, pg. 185, Jan. 16, 1947.